United States Patent [19]

Sendoda

[11] Patent Number: 5,392,179
[45] Date of Patent: Feb. 21, 1995

[54] MAGNETIC READ/WRITE HEAD ASSEMBLY WITH A REDUCED SLIDER SIZE

[75] Inventor: Mitsuru Sendoda, Tokyo, Japan

[73] Assignee: NEC Corporation, Japan

[21] Appl. No.: 38,673

[22] Filed: Mar. 26, 1993

[30] Foreign Application Priority Data

Apr. 23, 1992 [JP] Japan .................. 4-104460

[51] Int. Cl.⁶ .............................................. G11B 5/48
[52] U.S. Cl. .................................................. 360/104
[58] Field of Search ......................................... 360/104

[56] References Cited

U.S. PATENT DOCUMENTS

| | | | |
|---|---|---|---|
| 4,819,094 | 4/1989 | Oberg | 360/104 |
| 4,947,275 | 8/1990 | Hinlein | 360/104 |
| 5,012,369 | 4/1991 | Owe et al. | 360/104 |
| 5,107,383 | 4/1992 | Takeuchi et al. | 360/104 |
| 5,251,082 | 10/1993 | Elliott et al. | 360/98.07 |

Primary Examiner—John H. Wolff
Attorney, Agent, or Firm—Laff, Whitesel, Conte & Saret

[57] ABSTRACT

A magnetic read/write head assembly has a slider including a first and a second insulation films formed on the both surfaces of a distal end portion of a suspension arm, the first and the second insulation films being formed by a sputtering technology. The suspension arm has a generally thin plate configuration having a neck portion for serving a function similar to a gimbal spring for permitting freedom of motion of the slider. A small number of constituent parts, a small size and weight of the head assembly can be obtained for achieving a low flying height and a high recording density performance.

6 Claims, 4 Drawing Sheets

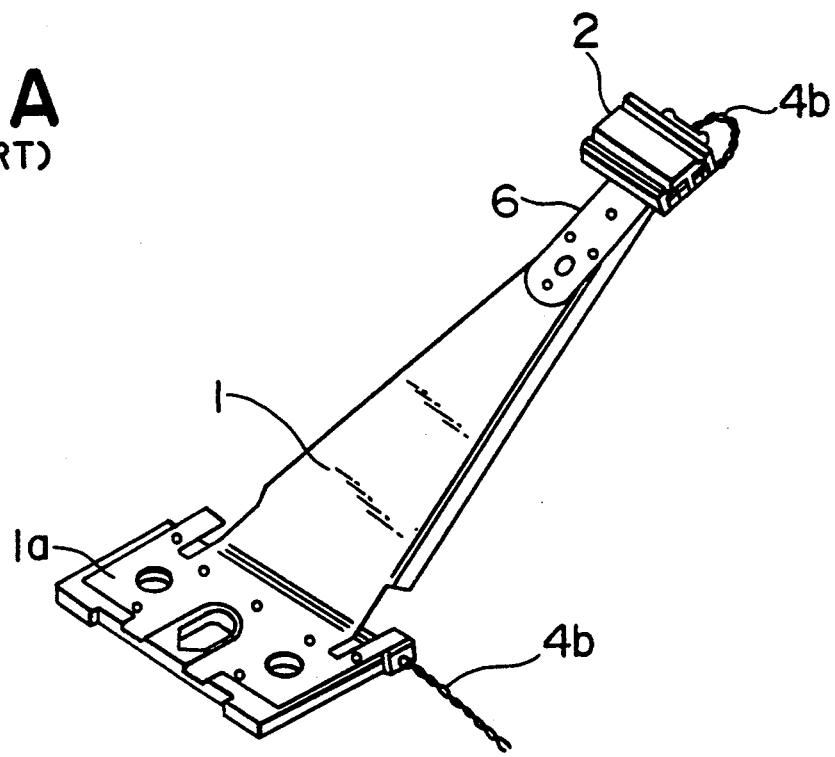
FIG. IA
(PRIOR ART)
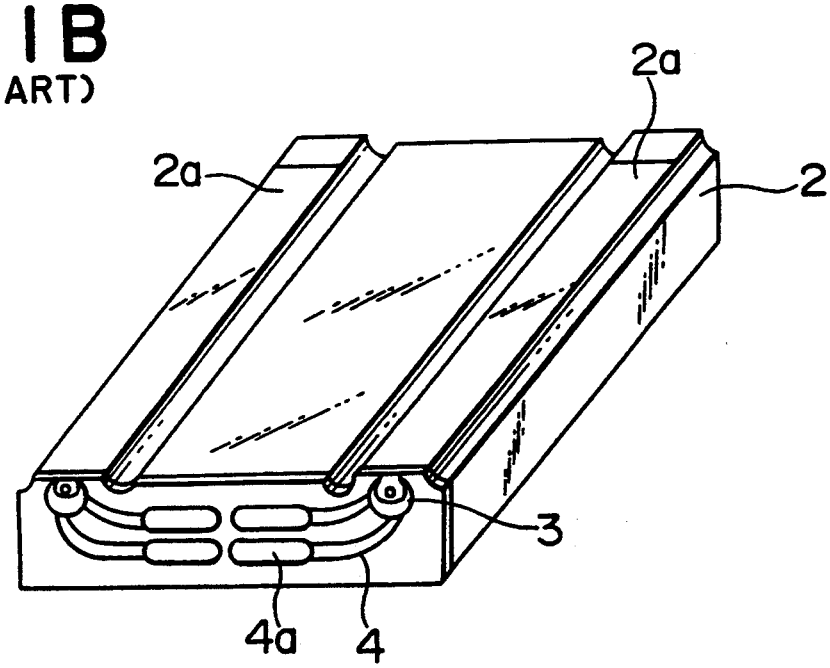
FIG. IB
(PRIOR ART)

MAGNETIC READ/WRITE HEAD ASSEMBLY WITH A REDUCED SLIDER SIZE

BACKGROUND OF THE INVENTION (a) Field of the Invention

The present invention relates to a magnetic read/write head assembly for a magnetic disk drive, and more particularly to a magnetic read/write head assembly in which constituent parts thereof are reduced in number and weight for an easy fabrication and for obtaining a low flying height and a quick response during a contact start and stop.

(b) Description of the Related Art

A conventional magnetic read/write (read and/or write) head assembly is shown in FIGS. 1A and 1B, in which a slider 2 mounting electromagnetic transducers 3 is shown with an air bearing surface 2a facing upward. The slider 2 is supported by a gimbal spring 6 at one end thereof for permitting freedom of motion of the electromagnetic transducers 3. The other end of the gimbal spring 6 is secured to the distal end portion of a suspension arm 1 which in turn is secured at its inner base portion 1a to a head positioning mechanism. The slider 2 further mounts thin film lead wires 4 and electrodes 4a for transmitting electric signal to or from the electromagnetic transducers 3, and the electrodes 4a are connected to lead wires 4b attached to the suspension arm 1.

The magnetic read/write head assembly as described above has a drawback in which a large number of constituent parts are included therein and these parts demand a skilled work in fabrication thereof. Further, there is another drawback in which the dimension and the weight of the slider are large so that quick response of the electromagnetic transducers during a contact start and stop process is not sufficient when a low and constant flying height is to be maintained for achieving a high density recording performance.

SUMMARY OF THE INVENTION

An object of the present invention is to provide a magnetic read/write head assembly in which the number of the constituent parts is reduced for an easy fabrication, and in which the dimension and the weight of the slider are reduced for achieving a high density recording performance.

According to the present invention, there is provided a magnetic read/write head assembly for a magnetic disk drive, the assembly comprising: a suspension arm having a distal end portion and an inner portion for carrying the distal end portion in a direction parallel to a magnetic recording disk, the distal end portion having a first side surface, a second side surface opposed to the first side surface; a first insulation layer formed on the first side surface; an electromagnetic transducer mounted on the second side surface and having a recording gap opposite to the magnetic recording disk; and a second insulation layer covering the electromagnetic transducer: wherein at least one of the first and second insulation layers has an air bearing surface adjacent to the recording gap.

According to the magnetic read/write head assembly of the present invention, since the constituent parts thereof are reduced in number as compared to the conventional read/write head assembly, a less skilled work is sufficient in fabrication thereof. Further, since the dimension and the weight of the magnetic read/write head assembly may be reduced, a low and constant flying height can be maintained for achieving a high density recording performance.

BRIEF DESCRIPTION OF THE DRAWINGS

Other and further objects, features and advantages of the present invention will be more apparent from the following description, referring to the accompanying drawings in which:

FIG. 1A is a perspective view of a conventional magnetic read/write head assembly as observed from a side adjacent to a magnetic disk;

FIG. 1B is an enlarged perspective view of the slider and the electromagnetic transducer of FIG 1;

DESCRIPTION OF THE PREFERRED EMBODIMENTS

Figure 2A:
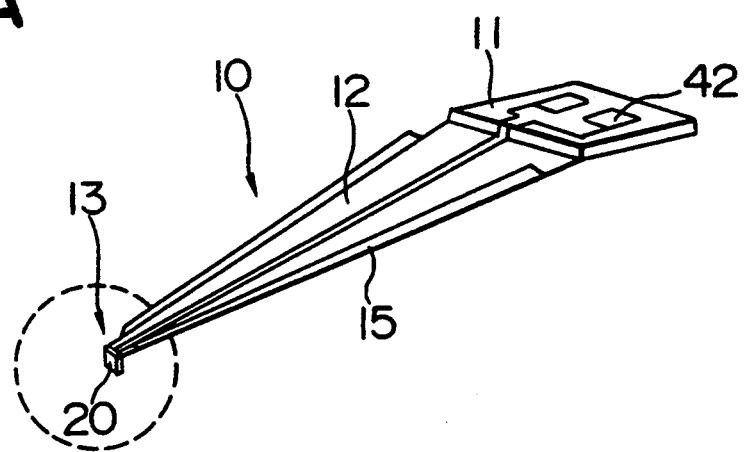
FIG. 2A is a perspective view of a magnetic read/write head assembly according to an embodiment of the present invention.
Figure 2B:
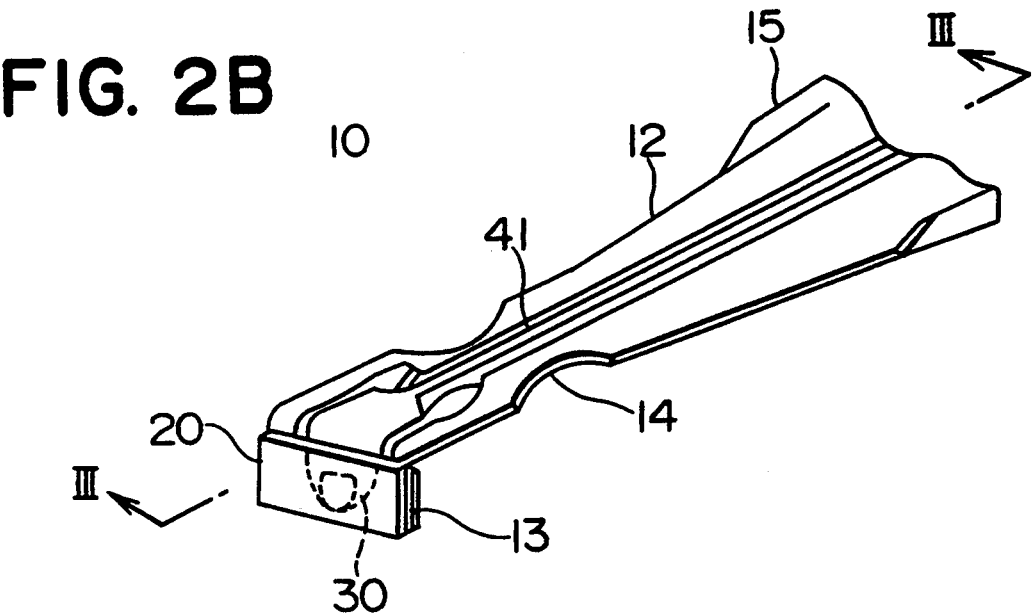
FIG. 2B is an enlarged perspective view of the portion of the magnetic read/write head assembly as encircled in FIG. 2A.

Now, the present invention will be described with reference to the drawings, which are not to scale within any particular degree of precision. The similar parts and portions of embodiments are designated at the same or similar reference symbols through the drawings for the sake of understanding. FIG. 2A shows a magnetic read/write head assembly according to an embodiment of the present invention and FIG. 2B shows the detail of the distal end portion 13 of a suspension arm 10 encircled in FIG. 2A. As shown in the drawings, the magnetic read/write head assembly comprises the suspension arm 10 having a base 11 mounting electrodes 42 thereon and attached to a head positioning mechanism not shown in the drawings, an inner portion 12 extending substantially in a horizontal direction, and a vertical distal end portion 13 mounting a slider 20.

The inner portion 12 of the suspension arm 10 extends in a slight falling gradient toward the distal end portion 13, and has a wide surface end adjacent to the base 11 and a small width end adjacent to the distal end portion 13. A neck 14 is formed adjacent to the small width end of the inner portion 12 for reducing the rigidity of the suspension arm 10 and serving a function similar to the gimbal spring 6 of the conventional head assembly of FIG. 1A. The neck 14 has smaller width and thickness than the other portions adjacent to the neck 14. The neck 14 can be formed by etching the inner portion 12 of the suspension arm 10 formed of, for example, stainless steel.

The inner portion 12 of the suspension arm 10 has a generally thin plate configuration and includes reinforcements 15 at the both edges thereof. The suspension arm 10 supports conductors of a thin film pattern 41 formed in the axial direction of the suspension arm 10 and connected between the electrodes 42 and an electromagnetic transducer 30 mounted on the slider 20. The thin film pattern 41 is deposited by a conventional sputterring technology on an insulation film covering the upper surface of the suspension arm 10.

Figure 3:
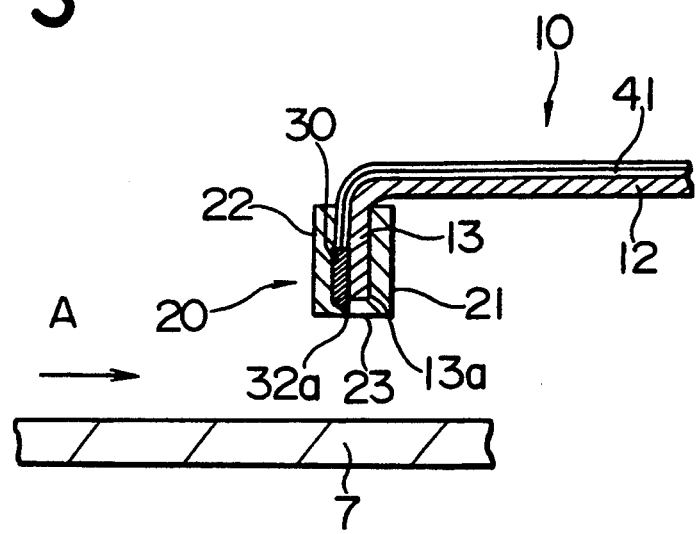
FIG. 3 is a longitudinal sectional view of the portion of the magnetic read/write head assembly of FIG. 2B taken on a line III—III.

FIG. 3 shows a longitudinal sectional view of the magnetic read/write head assembly as described above, the view being taken on a line III—III of FIG. 2B. In FIG. 3, the rotational direction of a magnetic recording disk 7 is shown by an arrow A. The slider 20 is mounted on the distal end portion 13 of the suspension arm 10 and includes a first insulation layer 21 and a second insulation layer 22 both formed of an oxide material such as Al$_2$O$_3$ by a sputterring technology. The first and the second insulation layers 21 and 22 are formed on the trailing side surface and the leading side surface of the distal end portion 13, respectively. The slider 20 has a flat air bearing surface 23 at the lower ends of both the insulation layers 21 and 22, the air bearing surface covering the end 13a of the distal end portion 13 for protecting the surface of the spinning magnetic disk 7 from the sharp end 13a of the distal end portion 13. The dimension of the air bearing surface is, for example, 0.1 mm long in the rotational direction of the magnetic recording disk and 1 mm wide.

The electromagnetic transducer 30 is formed on the leading side surface of the distal end portion 13 in this embodiment and covered by the second insulation layer 22 of the slider 20. The electromagnetic transducer 30 has a recording gap 32a opposite to the surface of the magnetic recording disk 7 in a spaced relationship therewith for reading/writing magnetic signals. The electromagnetic transducer 30, however, may be formed on either of the leading or trailing side surface of the distal end portion 13.

Figure 4:
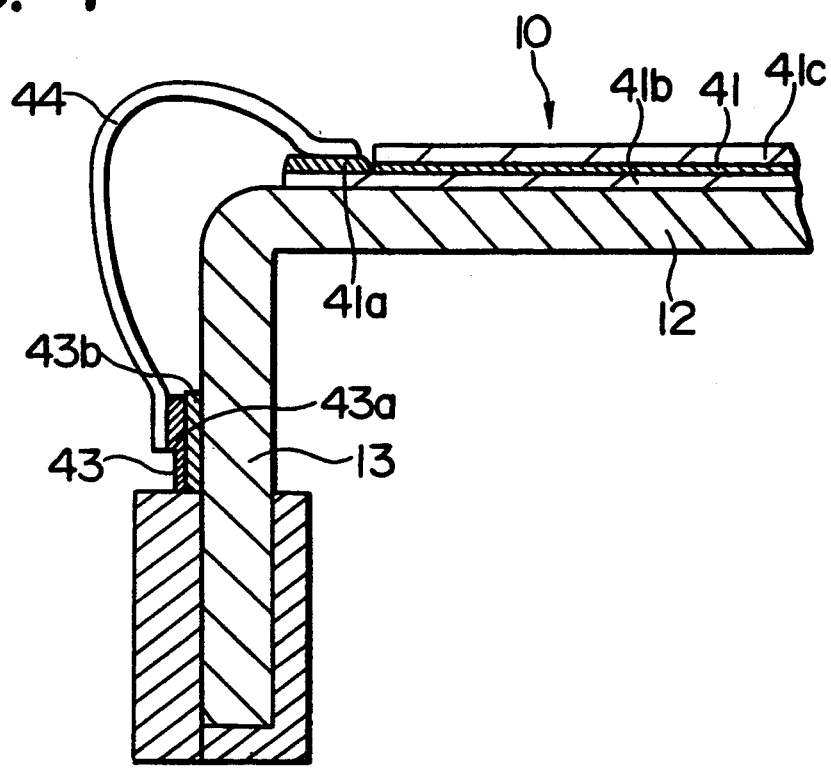
FIG. 4 is a longitudinal sectional view of a portion of a magnetic read/write head assembly according to another embodiment of the present invention.

FIG. 4 shows a partial longitudinal section of a magnetic read/write head assembly according to another embodiment of the present invention, with an electromagnetic transducer being omitted in the drawing. With the embodiment of FIG. 4, the thin film patterns 41 and 43 are formed separately on the substantially horizontal inner portion 12 and on the vertical distal end portion 13. Both terminals 41a and 43a of the aluminium thin film patterns 41 and 43 each including two conductors are connected to each other by flexible conductors 44.

The flexible conductors 44 are attached to the terminals 41a and 43a by soldering, after bending the suspension arm 10 for shaping the vertical distal end portion 13 and the substantially horizontal inner portion 12. In this configuration, the suspension arm 10 can be bent after sputterring of aluminium and Al$_2$O$_3$ for forming thin film conductors 41 and 43, insulation films 41b, 41c and 43b, and the slider 20, without a concern of detachment of the thin film conductors and the insulation films from the suspension arm 10.

Figure 5:
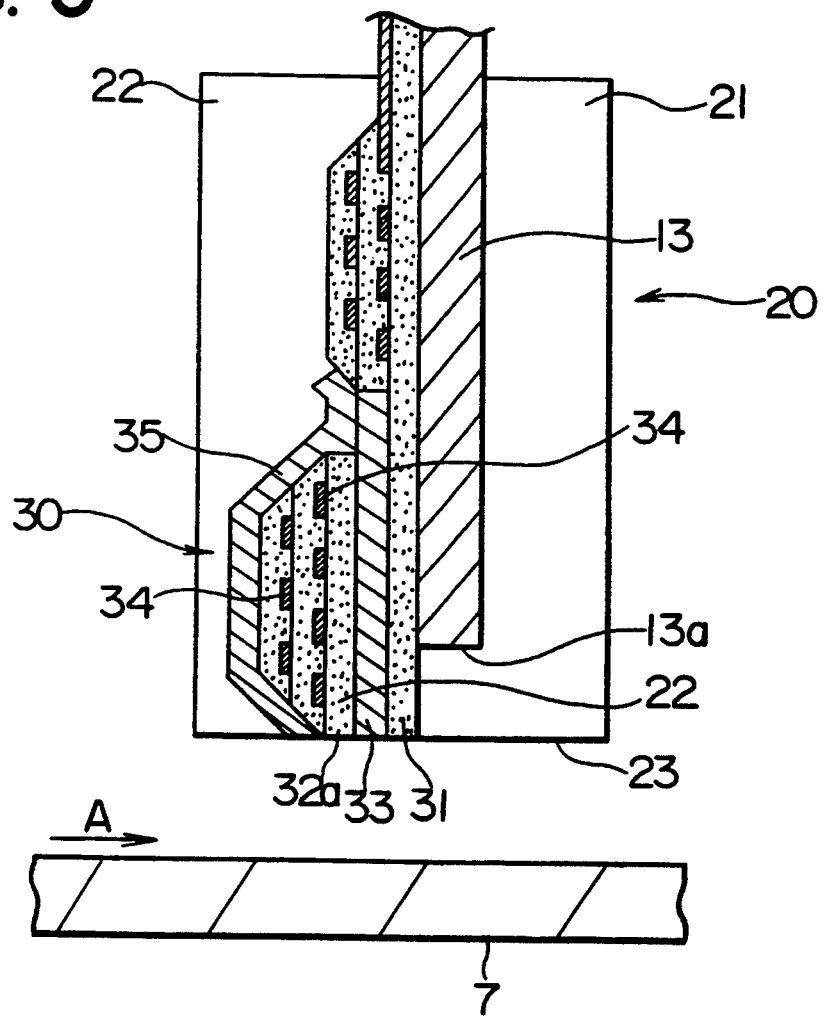
FIG. 5 is an enlarged longitudinal sectional view of the magnetic read/write head assembly of FIG. 4 for showing the detail of the electromagnetic transducer.

FIG. 5 shows an exemplified configuration of the electromagnetic transducer of the magnetic read/write head assembly of FIG. 4. The first insulation layer 21 of the slider 20 is formed on the trailing side surface of the distal end portion 13 of the suspension arm 10, the lower end surface of the first insulation layer 21 being a part of the air baring surface 23. On the leading side surface of the distal end portion 13, there is formed an electromagnetic transducer 30 of a thin film magnetic read/write, head. The electromagnetic transducer 30 comprises an insulation film 31, a first or lower magnetic film 33, a gap layer 32 for defining a recording gap 32a, two conductive layers 34 forming a coil, and a second or upper magnetic film 35, consecutively formed on the leading side surface of the distal end portion 13 of the suspension arm 10.

The second insulation layer 22 constituting the slider 20 together with the first insulation layer 21 is formed by, for example, sputtering to cover the electromagnetic transducer 30. After the whole layers of the electromagnetic transducer S0 and the slider 20 are formed, the lower end of the slider 20 is ground together with the gap portion 32a of the electromagnetic transducer 30, for obtaining the flat air .bearing surface 23. The air bearing surface 23 of the slider 20, however, may be of any shape adopted in a conventional slider. The lower and upper magnetic films 33 and 34 are formed of magnetic material such as NiFe and each of insulation film 31 and the gap layer 32 may be formed of Al$_2$O$_3$ or another oxide material.

Figure 6:
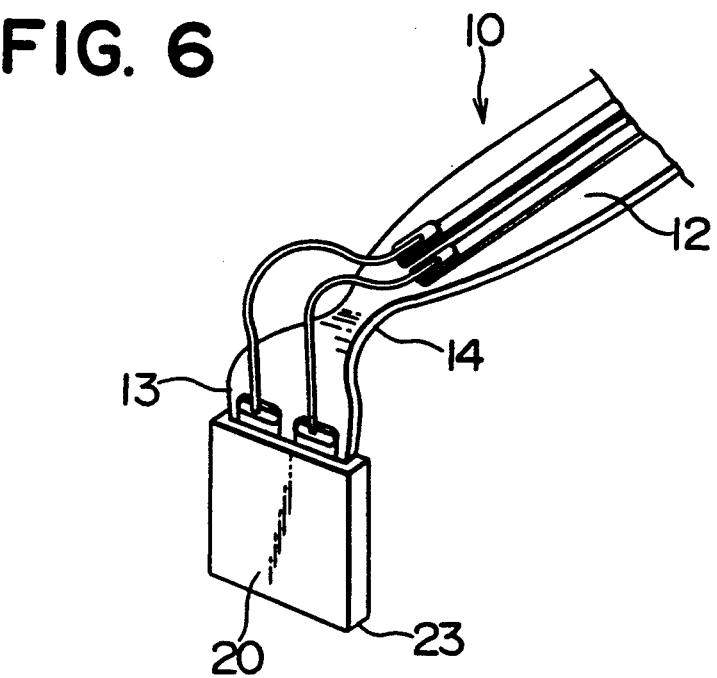
FIG. 6 is a perspective view of a variation of the magnetic read/write head assembly of FIG. 4.

FIG. 6 shows a variation of the magnetic read/write head assembly shown in FIGS. 4 and 5. The inner portion 12 of the suspension arm 10 is inclined at an angle of about 30 degree with respect to the magnetic recording disk opposing the air bearing surface 23 of the slider 20. The suspension arm 10 is bent at the neck portion 14 to draw a large arc for obtaining the vertical distal end portion 13. The neck portion 14 has, for example, the minimum width of about 0.3 mm or less and the minimum thickness of about 0.03 mm as compared to the width of about 1 mm and the thickness of about 0.07 mm of the other portion of the inner portion 12 adjacent to the neck portion 14.

The angle between the axes of the inner portion 12 and the distal end portion 13 may be from 135 degree to approximately 90 degree depending on the inclination of the inner portion 12. In this embodiment, the dimension of the slider 20 can be reduced to, for example, about 1 mm×1 mm as observed in the rotational direction of the magnetic recording disk.

In the above embodiments, the suspension arm may be preferably formed from a thin plate of stainless-steel or other metal material. The thin film conductors may be formed of copper as well as aluminium or an aluminium alloy. The neck of the suspension arm may be of any configuration provided that the neck permits freedom of motion of the electromagnetic transducer for keeping a small spacing variation between the recording gap and the magnetic disk.

According to the above embodiments, since the photolithographic technology can be used for forming thin films directly on the suspension arm, the constituent parts as well as the dimension and the weight of the magnetic read/write head assembly can be reduced so that an easy fabrication and a high density recording performance can be obtained.

Although the present invention is described with reference to the embodiments, the present invention is not limited to such embodiments and it will be obvious for those skilled in the art that various modifications or alterations can be easily made based on the above embodiments under the scope of the present invention.

What is claimed is:

1. A magnetic read/write head assembly for a magnetic disk drive, said assembly comprising: a suspension arm having a distal end portion and an inner portion for carrying said distal end portion in a direction parallel to a magnetic recording disk, said distal end portion having a first side surface perpendicular to the magnetic recording disk, and a second side surface opposed to said first side surface; a first insulation layer formed on said first side surface; an electromagnetic transducer mounted on said second side surface and having a recording gap opposite to the magnetic recording disk; a second insulation layer covering said electromagnetic transducer; wherein at least one of said first and second insulation layers has an air bearing surface perpendicular to said first and second side surface and adjacent to said recording gap; and a slider extending beyond the end of said distal end portion and being covered by said air bearing surface.

2. A magnetic read/write head assembly as defined in claim 1 wherein said electromagnetic transducer is a thin film magnetic read/write head.

3. A magnetic read/write head assembly as defined in claim 1 wherein said suspension arm is formed of a metal plate.

4. A magnetic read/write head assembly as defined in claim 1 wherein said inner portion includes a neck portion having a cross-section which is smaller than the cross-section of portions other than said neck portion and adjacent to said neck portion.

5. A magnetic read/write head assembly as defined in claim 1 further comprising a thin film lead wire for transmitting a signal from and to said electromagnetic transducer, said lead wire including a first thin film and a second thin film carried by said distal end portion and by said inner portion, respectively, and a flexible wire connecting said first thin film with said second thin film.

6. A magnetic read/write head assembly as defined in claim 1 wherein said distal end portion extends in a direction toward said magnetic recording disc, and at an angle between 135 degree and about 90 degree as measured from the axis of said inner portion.

* * * * *